US006192224B1

(12) United States Patent
Grayson et al.

(10) Patent No.: US 6,192,224 B1
(45) Date of Patent: *Feb. 20, 2001

(54) MULTI-BAND MOBILE TELECOMMUNICATIONS STATION

(75) Inventors: Mark Grayson; Christophe M. J. Jouin, both of Berkshire (GB)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/062,897

(22) Filed: Apr. 21, 1998

(51) Int. Cl.[7] ....................................................... H04B 7/26
(52) U.S. Cl. ................... 455/168.1; 455/33.1; 455/54.1; 455/161.1
(58) Field of Search ............................. 455/161.1, 161.3, 455/33.1, 34.2, 34.4, 54.1, 54.2, 56.1, 168.1, 434, 515, 512, 513, 12.1, 13.1, 405; 370/90, 931, 320

(56) References Cited

U.S. PATENT DOCUMENTS

| 4,916,728 | * | 4/1990 | Blair ........................................ 379/59 |
| 5,159,625 | * | 10/1992 | Zicker ..................................... 379/59 |
| 5,517,677 | | 5/1996 | Moon ................................. 455/161.1 |
| 5,535,430 | * | 7/1996 | Aoki et al. ............................ 455/54.1 |
| 5,590,395 | * | 12/1996 | Diekelman ........................... 455/13.1 |
| 5,903,837 | * | 5/1999 | Wiedeman ............................. 455/427 |
| 5,915,217 | * | 6/1999 | Wiedeman et al. ................... 455/427 |
| 5,918,157 | * | 6/1999 | Wiedeman et al. ................. 455/13.1 |

FOREIGN PATENT DOCUMENTS

| 0 283 955 | 9/1988 | (EP) . |
| 0 603 049 | 6/1994 | (EP) . |
| 2284964 | 6/1995 | (GB) . |
| 2 320 399 | 6/1998 | (GB) . |
| WO 93/16548 | 8/1993 | (WO) . |
| WO9316548 | 8/1993 | (WO) . |
| WO 98/10617 | 3/1998 | (WO) . |

* cited by examiner

Primary Examiner—Thanh Cong Le
Assistant Examiner—Pablo Tran
(74) Attorney, Agent, or Firm—Sughrue, Mion, Zinn, Macpeak & Seas, PLLC

(57) ABSTRACT

A mobile telecommunications station for use in a multiple network environment is disclosed. The mobile telecommunications station includes a radio receiver capable of operating in a plurality of different frequency bands used by different networks. The mobile telecommunications station further includes a network preference data storage for storing data which identifies a level of priority for each network. At least one of the networks is a preferred network, and a search controller determines the search frequency at which each network is searched in accordance with the preference data.

14 Claims, 2 Drawing Sheets

MULTI-BAND MOBILE TELECOMMUNICATIONS STATION

BACKGROUND OF THE INVENTION

1. Field of the Invention

This invention relates to a multi-band mobile telecommunications station for use in a multiple network environment, for example an environment in which there is a network of terrestrial base stations and another network of orbiting satellite stations.

2. Description of the Related Art

The mobile station needs to be able to establish when it is in the coverage zone of any terrestrial base station or orbiting satellite station, but the operations required to enable the mobile station to search for such stations are power consuming.

SUMMARY OF THE INVENTION

It is accordingly an object of the present invention to provide a mobile telecommunications station which overcomes this problem.

A mobile telecommunications station in accordance with the invention includes a radio receiver capable of operating in a plurality of different frequency bands used by different networks, network preference data storage means for storing data which identifies a level of priority for each network, at least one of the networks being a preferred network, and a search control means determining the search frequency at which each network is searched in accordance with the preference data.

The search control means preferably varies the search strategy according to the network stations found in a previous search. For example, in GSM/Satellite dual mode mobile station, the search control means would normally reduce the frequency of satellite searches to a minimum. When the mobile station was not in the coverage zone of any GSM or Satellite base station, the frequency of both satellite and GSM scans would be increased. When the mobile station was not in the coverage zone of any GSM base station, but still in the coverage zone of a satellite network, the frequency of GSM scans would not be reduced.

The above and other objects, features and advantages of the present invention will become apparent from the following description with reference to the accompanying drawings which illustrate examples of the present invention.

DESCRIPTION OF A PREFERRED EMBODIMENT

Figure 1:
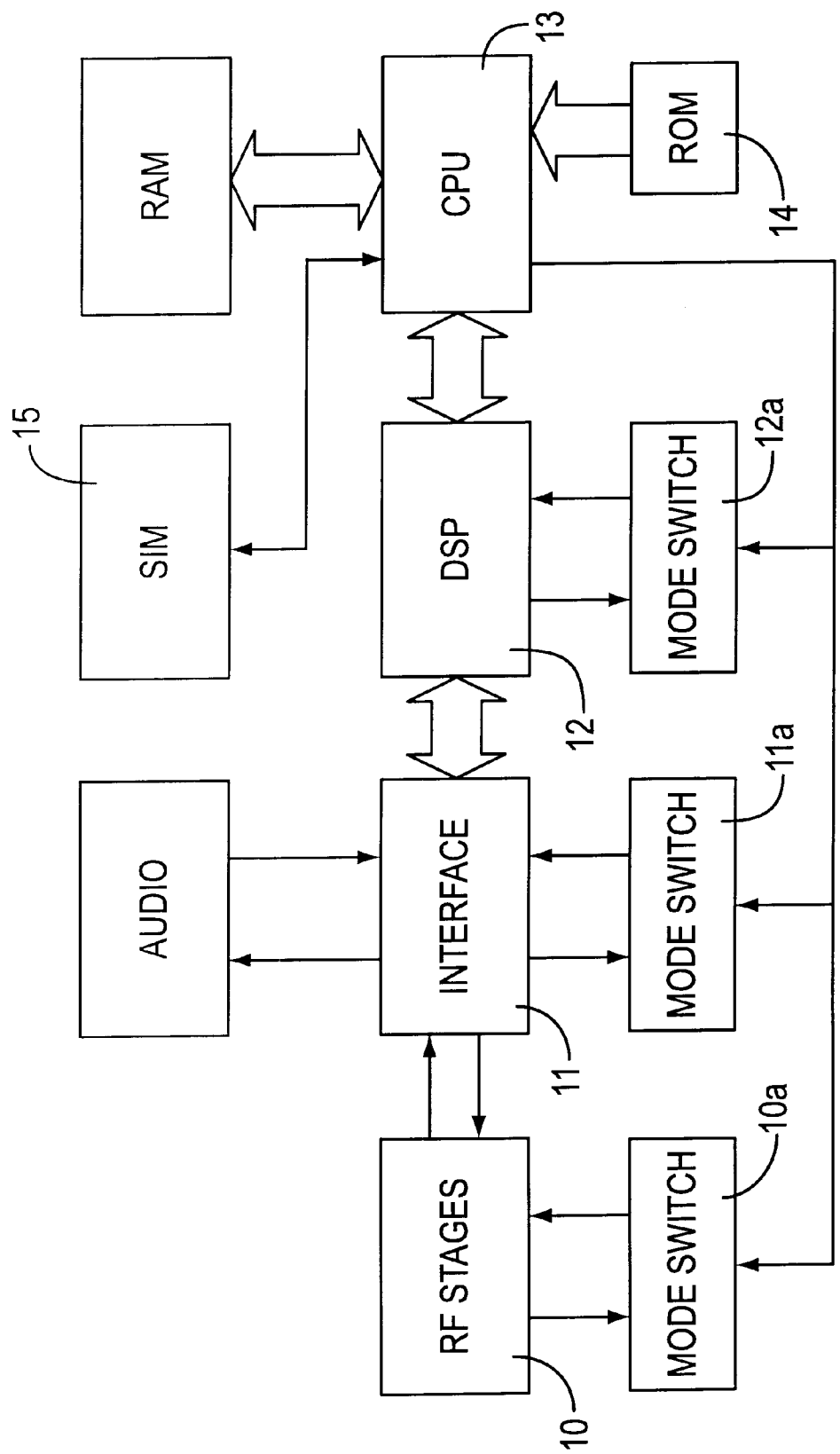
FIG. 1 is a block diagram of a multi-band multi-mode mobile telecommunications station.

FIG. 1 shows the basic blocks of the mobile phone, namely an RF stage 10 for receiving and transmitting, an interface stage 11 which includes frequency translation components and filtering, calibration, DAC and ADC functions, a DSP 12 which implements speech coding and decoding and various frequency control and synchronisation algorithms, and a CPU 13 which exercises control over the functioning of the phone in accordance with data stored in ROM 14 and in a SIM module (personal ID card) 15.

The CPU is, in particular, responsible for the timing of scans for nearby terrestrial base stations and for satellite stations. During scanning operations, the CPU commands the DSP to scan up to three frequency values during one TDMA frame. The CPU provides the DSP with the three frequency values to check, and progressively scans through the whole terrestrial band. This cycling normally continues until there is a detected signal sufficiently strong for AGC to be established within the RF stage and then RSSI levels are received. The CPU orders the frequencies in increasing levels of RSSI. If any is above a threshold value, the CPU commands the DSP to synchronise to the channel. The DSP attempts to decode broadcast messages by first synchronising its operation to the exact timing and frequency of the transmission and then attempts to decode a synchronisation burst. If this is successful this is registered by the CPU and the mobile station leaves out-of-zone (OOZ) operation and "camps" on the channel found.

Operations in the terrestrial and satellite bands involve different RF tuning procedures and different protocols for channel recognition and signal decoding. Thus, when searching terrestrial channels the DSP, interface and RF stages must operate in one mode and when searching for satellite channels, the same blocks must operate in a different mode. FIG. 1 shows each of the blocks 10, 11, 12 with a mode control switch $10_a$, $11_a$ and $12_a$ control by the CPU for switching the blocks between modes when necessary.

Figure 2:
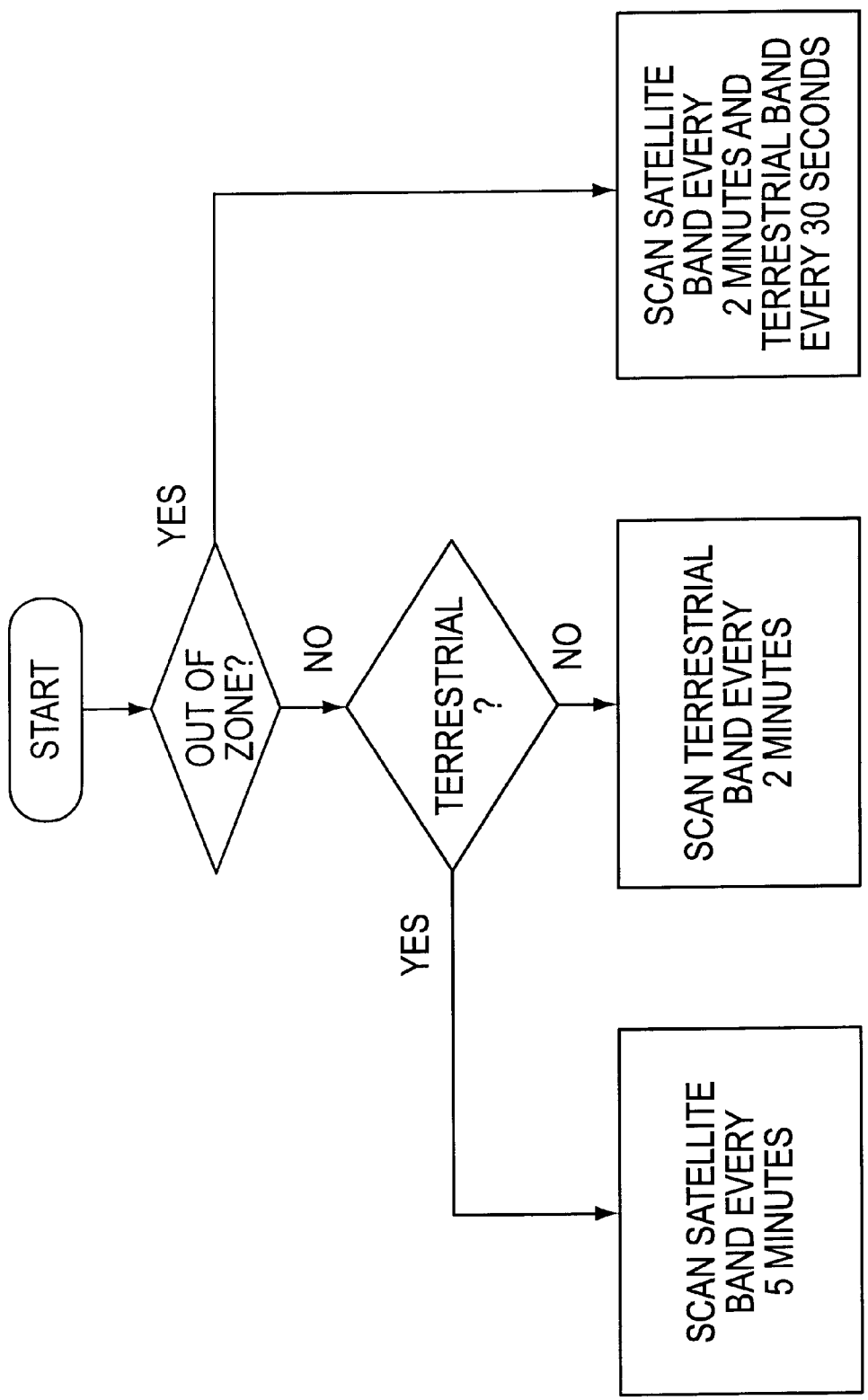
FIG. 2 is a flowchart of software used in the mobile station to control scanning operations.

The CPU is programmed to give priority to terrestrial operation. Network preference data is stored in the CPU ROM (preferably EEPROM) or in the SIM as a list of networks at successive addresses in the memory. The list could contain names for the networks, such as GSM 900 MHz, GSM 1800 MHz, satellite, or tokens for the network names, the networks being listed in order of preference. In the example described herein GSM 900 MHz is the most preferred network and satellite the least preferred. Such prioritisation is illustrated in FIG. 2. As shown, based on decisions as to whether the mobile station is currently in OOZ operation or is camped on a satellite or terrestrial channel, the CPU instructs the DSP to search at different intervals. If the mobile stations is in OOZ operation, then terrestrial searches are carried out every thirty seconds and satellite searches every two minutes. If the mobile station is camped on a satellite network channel, the terrestrial band is searched every two minutes. If the mobile station is camped on a terrestrial channel, the satellite band is searched every five minutes.

It will be clear to those skilled in this art that the principle described above can be extended to mobile stations capable of operating in three or more bands and in three or more different modes.

While a preferred embodiment of the present invention has been described using specific terms, such description is for illustrative purposes only, and it is to be understood that changes and variations may be mode without departing from the spirit or scope of the following claims.

What is claimed is:

1. A mobile telecommunications station, comprising:
   a radio receiving means for operating in a plurality of different frequency bands used by different networks;
   coverage zone determination means for establishing a time-based search interval;
   network preference data storage means for storing data which identifies a level of priority for each network, wherein at least one of the networks is a preferred network; and
   search control means for determining the number of times each network is to be searched in a predetermined interval, in accordance with the preference data received from said network preference data storage means, wherein the search control means varies a search strategy for the networks based on the networks found in a previous search.

2. The mobile telecommunications station as claimed in claim 1 wherein said coverage zone determination means varies the time-based search interval for searching each network according to whether said mobile telecommunications station is camped on a channel or is operating in an out-of-zone mode.

3. The mobile telecommunications station as claimed in claim 2 wherein the search control means searches the preferred network more frequently than the other networks when said mobile telecommunications station is operating in an out-of-zone mode.

4. The mobile telecommunications station as claimed in claim 2 wherein the search control means searches the other networks less frequently than it searches its preferred network when the mobile telecommunications station is camped on a channel of its preferred network.

5. The mobile telecommunications station according to claim 1 which communicates with a terrestrial base station and an orbiting satellite station.

6. The mobile telecommunications station according to claim 1 wherein said coverage zone determination means determines whether said mobile telecommunications station is camped on a communications channel or is operating in an out-of-zone mode.

7. The mobile telecommunications station according to claim 6 wherein the communications channel is either a satellite or terrestrial channel.

8. A mobile telecommunications station, comprising:

a radio receiver/transmitter which operates in a plurality of frequency bands used by different networks;

an interface which receives an input from said radio receiver and performs frequency translation;

a digital signal processor which receives an input from said interface to implement speech coding/decoding by synchronizing its operation to a timing and frequency of the input from said interface;

a memory which stores network preference data; and a central processing unit which receives inputs from said digital signal processor and said memory to execute time-based search intervals for detecting one of said different networks from the network preference data which is located within a range of said mobile telecommunications station, and commanding said digital signal processor to scan a plurality of frequency bands until a signal is detected which exceeds a predetermined threshold value, wherein the central processing unit varies a search strategy for the networks based on the networks found in a previous search.

9. The mobile telecommunications station according to claim 8 wherein said memory is a random access memory.

10. The mobile telecommunications station according to claim 8 wherein said memory is a single instruction memory.

11. The mobile telecommunications station according to claim 8, wherein the time-based search interval is determined by whether said mobile communications station is camped on a communications channel or is operating in an out-of-zone mode.

12. The mobile telecommunications station according to claim 11 wherein the communications channel is either a satellite or terrestrial channel.

13. The mobile telecommunications station according to claim 8, wherein said memory stores the network preference data in order of preference.

14. The mobile telecommunications station according to claim 8, wherein the central processing unit is programmed to give priority to terrestrial operation.

* * * * *